(No Model.)

W. F. SCANTLEBURY.
HORSE COLLAR.

No. 313,775. Patented Mar. 10, 1885.

WITNESSES:
Otto Hufeland
A Faber du Faur Jr

INVENTOR
Woodman F. Scantlebury
BY Van Santvoord & Hauff
ATTORNEYS

UNITED STATES PATENT OFFICE.

WOODMAN F. SCANTLEBURY, OF BROOKLYN, NEW YORK.

HORSE-COLLAR.

SPECIFICATION forming part of Letters Patent No. 313,775, dated March 10, 1885.

Application filed August 14, 1884. (No model.)

*To all whom it may concern:*

Be it known that I, WOODMAN F. SCANTLEBURY, a citizen of the United States, residing at Brooklyn, in the county of Kings and State of New York, have invented new and useful Improvements in Horse-Collars, of which the following is a specification.

The object of this invention is to construct a horse-collar which gives freedom to the windpipe of the horse, and which is provided with a top piece adapted to turn in a vertical as well as in a horizontal plane, and to be accommodated to horses of different stature. The peculiar and novel construction of my horse-collar is pointed out in the following specification and claims and illustrated in the accompanying drawings, in which—

Figure 1:
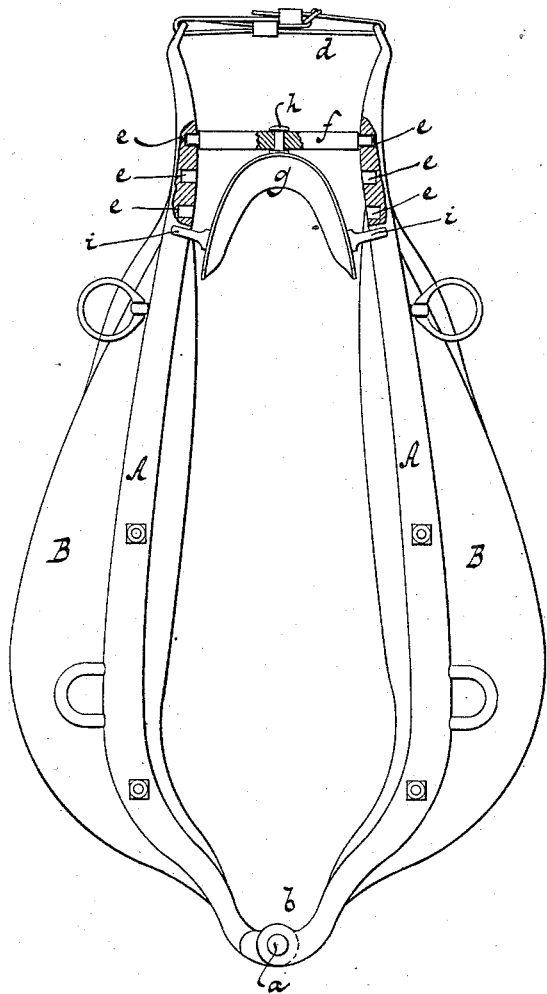
Figure 2:
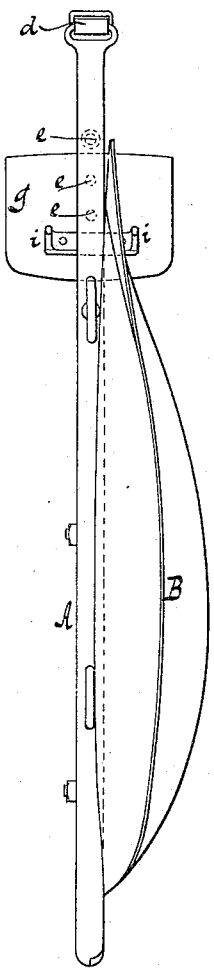

Figure 1 represents a front view. Fig. 2 is a side view.

Similar letters indicate corresponding parts.

In the drawings, the letters A A designate the hames, which are secured to the pads B B in a manner well known to harness-makers. The hames are connected at their lower ends by a pivot, $a$, so that they can be opened and closed, and they extend beyond the lower edges of the pads, forming a well, $b$, which prevents the collar from pressing against the wind-pipe of the horse and allows the animal to breath freely. The hames are connected at their upper ends by a strap, $d$, and in their inner sides are holes $e\ e$, (two or more in each of the hames,) which form the bearings for the gudgeons of a bar, $f$, to which the top piece, $g$, is connected by a pivot, $h$. By these means the top piece is free to swing in a vertical plane on the gudgeons of the bar $f$ and in a horizontal plane on the pivot $h$, so that it can accommodate itself to the movements of the horse's head, and that it is not liable to chafe the neck of the horse.

When the strap $d$, which connects the tips of the hames, is loosened, the hames can be swung open on their pivot $a$, so that the bar $f$, which supports the top pieces, can be inserted into either set of holes $e\ e$, and I have provided several sets of such holes, so that the top piece can be raised or lowered, according to the stature of the horse to which the collar is to be applied. On the back of this top piece are secured stops $i$, which prevent the same from turning in either direction beyond the desired limit.

The bar $f$, which supports the top piece, instead of being journaled in the hames, may be journaled in a frame which is secured to the hames or to the collar.

What I claim as new, and desire to secure by Letters Patent, is—

1. The combination, with the hames having two series of orifices, $e$, of the rocking bar $f$, supported in the orifices and vertically adjustable, the top piece, $g$, and the vertical pivot $h$, swiveling the top piece centrally to the bar for permitting the top piece to swing vertically with the bar and horizontally on or with the pivot, substantially as described.

2. A horse-collar consisting of the hames A, connected at their lower ends by a pivot, $b$, combined with the rocking bar $f$, having its ends mounted in the hames at the upper ends thereof, the top piece, $g$, and the pivot $h$, swiveling the top piece centrally to the bar for permitting the top piece to swing vertically with the bar and horizontally on or with the pivot, substantially as described.

3. The combination, substantially as hereinbefore described, with the top piece and with the bar $f$, which supports the same, of hames connected at their lower ends by a pivot, $a$, and provided with two or more sets of holes to receive the gudgeons of the bar $f$.

In testimony whereof I have hereunto set my hand and seal in the presence of two subscribing witnesses.

WOODMAN F. SCANTLEBURY. [L. S.]

Witnesses:
 W. HAUFF,
 E. F. KASTENHUBER.